United States Patent [19]
Ishii et al.

[11] Patent Number: 4,715,466
[45] Date of Patent: Dec. 29, 1987

[54] FOUR WHEEL STEER CONTROL SYSTEM FOR FOUR WHEEL DRIVE VEHICLE, RESPONSIVE TO DRIVING TORQUE DISTRIBUTION

[75] Inventors: Katsumi Ishii, Sagamihara; Kanae Hirayama, Yamato; Yoshio Matsuoka, Tokyo; Kotei Takahashi, Sagamihara, all of Japan

[73] Assignee: Nissan Motor Co., Ltd., Japan

[21] Appl. No.: 931,846

[22] Filed: Nov. 18, 1986

[30] Foreign Application Priority Data

Nov. 20, 1985 [JP] Japan .................. 60-260948

[51] Int. Cl.⁴ .................................... B60K 23/08
[52] U.S. Cl. ........................... 180/233; 180/140; 364/424.1
[58] Field of Search ............ 180/140, 233, 244, 247; 280/91; 364/424.1, 424

[56] References Cited

U.S. PATENT DOCUMENTS 3,596,730  8/1971  Cecce .................. 180/140 X

FOREIGN PATENT DOCUMENTS 58-26634  2/1983  Japan .

Primary Examiner—John A. Pekar
Attorney, Agent, or Firm—Leydig, Voit & Mayer

[57] ABSTRACT

A vehicle is equipped with a four wheel drive system having a transfer, a four wheel steer system for steering front wheels and rear wheels, a sensor for sensing a condition of a driving torque distribution between the front wheels and rear wheels, by sensing a condition of the four wheel drive system, and a controller for controlling a rear wheel steer angle in accordance with the condition of the driving torque distribution by commanding the four wheel steer system in such a manner as to maintain the desirable weak understeer characteristic irrespective of change in the driving torque distribution at least when a vehicle speed is greater than a predetermined value.

14 Claims, 5 Drawing Figures

FOUR WHEEL STEER CONTROL SYSTEM FOR FOUR WHEEL DRIVE VEHICLE, RESPONSIVE TO DRIVING TORQUE DISTRIBUTION

CROSS REFERENCES TO RELATED APPLICATIONS

The following copending patent applications relate to subject matter similar to that of the present application but believed to be patentably distinct. (i) U.S. application Ser. No. 929,226, Inventors=ISHII et al., Corresponding prior foreign application=Japanese patent application No. 60-254498. (ii) U.S. application Ser. No. 929,424, Inventors=ISHII et al., Corresponding prior foreign application=Japanese patent application No. 60-254497. Both of these U.S. applications were filed Nov. 12, 1986.

BACKGROUND OF THE INVENTION

The present invention relates to a wheeled vehicle having a four wheel drive system capable of varying a driving torque distribution between a front wheel pair and a rear wheel pair, and a four wheel steer system for steering both of the front and rear wheel pairs.

Japanese patent provisional (un-examined) publication No. 58-26634 discloses an example of a conventional four wheel drive vehicle. The four wheel drive vehicle of that publication transmits driving power directly from a transmission to one of the front and rear wheel pairs, and transmits driving power to the other of the front and rear wheel pairs through a transfer clutch. The feature of that four wheel drive vehicle is a switch which is turned on when the automatic transmission is shifted to predetermined ranges with a selector lever, and which is connected in parallel with a manual switch, for selecting either a four wheel drive mode or a two wheel drive mode. In order to fully utilize the four wheel drive system, it is designed to change the drive mode from 2WD to 4WD automatically without need for manual operation when a 2 or 1 range is selected with the select lever for engine braking, starting the vehicle with a heavy load, or driving uphill.

In that four wheel drive system, however, the ratio of an angular displacement of the rear wheels to an angular displacement of the steering wheel is fixed, so that the steering characteristic of the vehicle is changed when the drive mode is changed from 2WD to 4WD and vice versa. In general, front-wheel-drive vehicles tend to understeer, rear-wheel-drive vehicles tend to oversteer, and four-wheel-drive vehicles tend to neutral-steer. Therefore, the driver must change the amount by which he turns the steering wheel in accordance with the drive mode. Vehicles requiring such driving skill are not suitable for average drivers. This problem is serious when the vehicle speed is high.

SUMMARY OF THE INVENTION

It is an object of the present invention to provide a four-wheel drive, four-wheel steer vehicle whose steering characteristic is maintained substantially unchanged irrespective of the driving torque distribution between the front and rear wheel pairs.

According to the present invention, a vehicle comprises a four-wheel drive system, a four-wheel steer system, a driving torque distribution sensing means, and a controlling means. The four wheel drive system has a transfer for distributing a driving torque (or force) between a front wheel pair and a rear wheel pair. The transfer has a means, such as a 2WD–4WD change-over mechanism or a transfer clutch, for varying a driving torque distribution between the front and rear wheel pairs. The four wheel steer system is arranged to steer both of the front and rear wheel pairs. The four wheel steer system has a means, such as a hydraulic actuator and an electromagnetic fluid flow control valve, for steering the rear wheel pair in response to a control signal which may be an electric signal. The driving torque distribution sensing means senses the driving torque distribution between the front and rear wheel pairs. For example, the driving torque distribution sensing means senses a position of a 2WD–4WD change-over manual lever for selecting either 2WD or 4WD. The controlling means is arranged to manipulate the control signal to vary a rear wheel steering ratio which is a ratio of a rear wheel steer angle to a steering wheel angle, in accordance with the driving torque distribution sensed by the driving torque distribution sensing means in such a manner as to maintain a steering characteristic of the vehicle substantially unchanged regardless of change in the driving torque distribution.

DETAILED DESCRIPTION OF THE INVENTION

Figure 1:
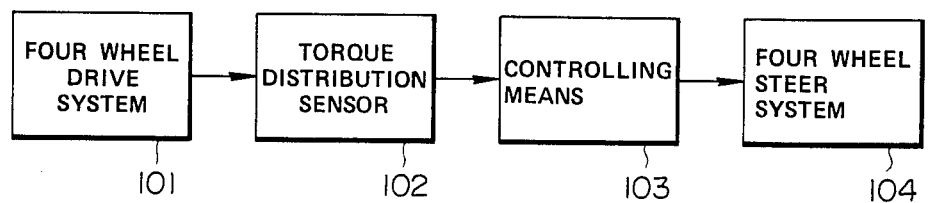
FIG. 1 is a block diagram schematically showing a control system of the present invention.

The block diagram of FIG. 1 roughly shows a control system according to the present invention, which comprises a four wheel drive system 101 having a transfer, a sensor 102 for sensing a driving torque distribution condition between front wheel pair and rear wheel pair in the four wheel drive system, a controlling means 103 such as a microcomputer, and a four wheel steer system 104 which is controlled by the controlling means 103 in accordance with the driving torque distribution sensed by the sensor 102.

Figure 4:
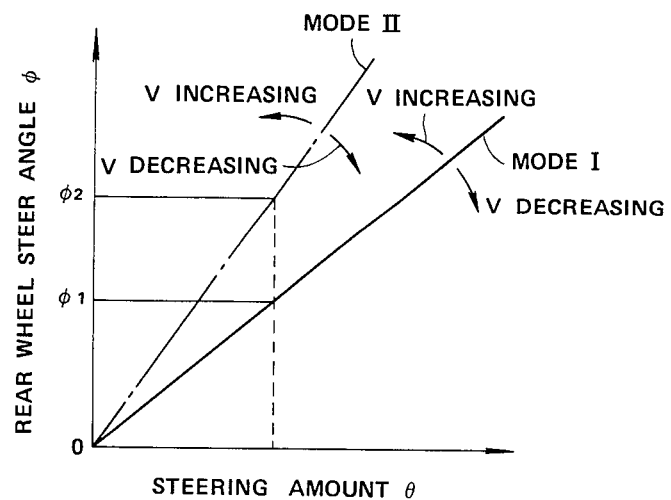
FIG. 4 is a graph showing relationships between a front wheel steer angle (or steering amount) $\theta$ and a rear wheel steer angle $\phi$, for operation of the embodiment of FIG. 2.
Figure 2:
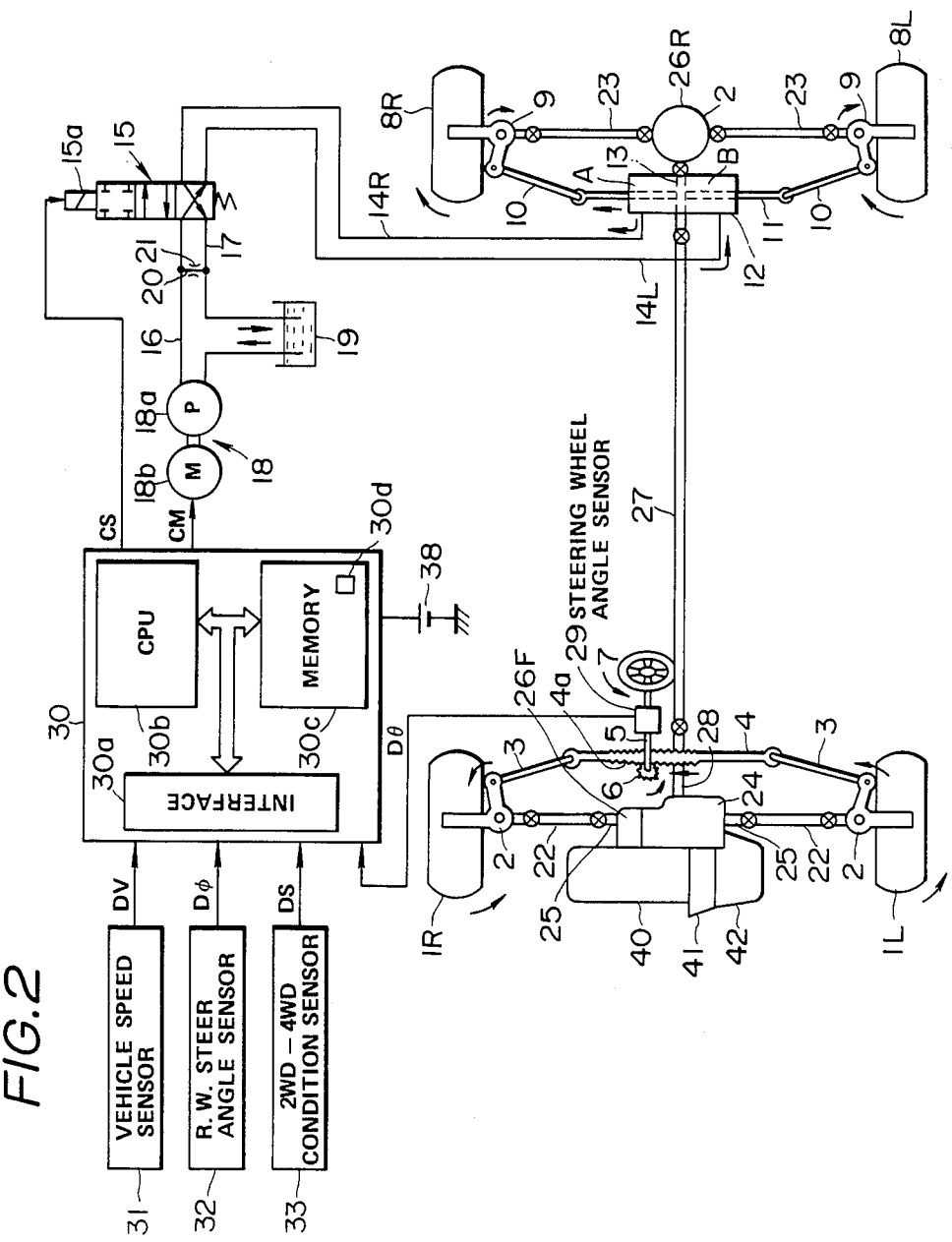
FIG. 2 is a schematic view of a vehicle according to one embodiment of the present invention.
Figure 3:
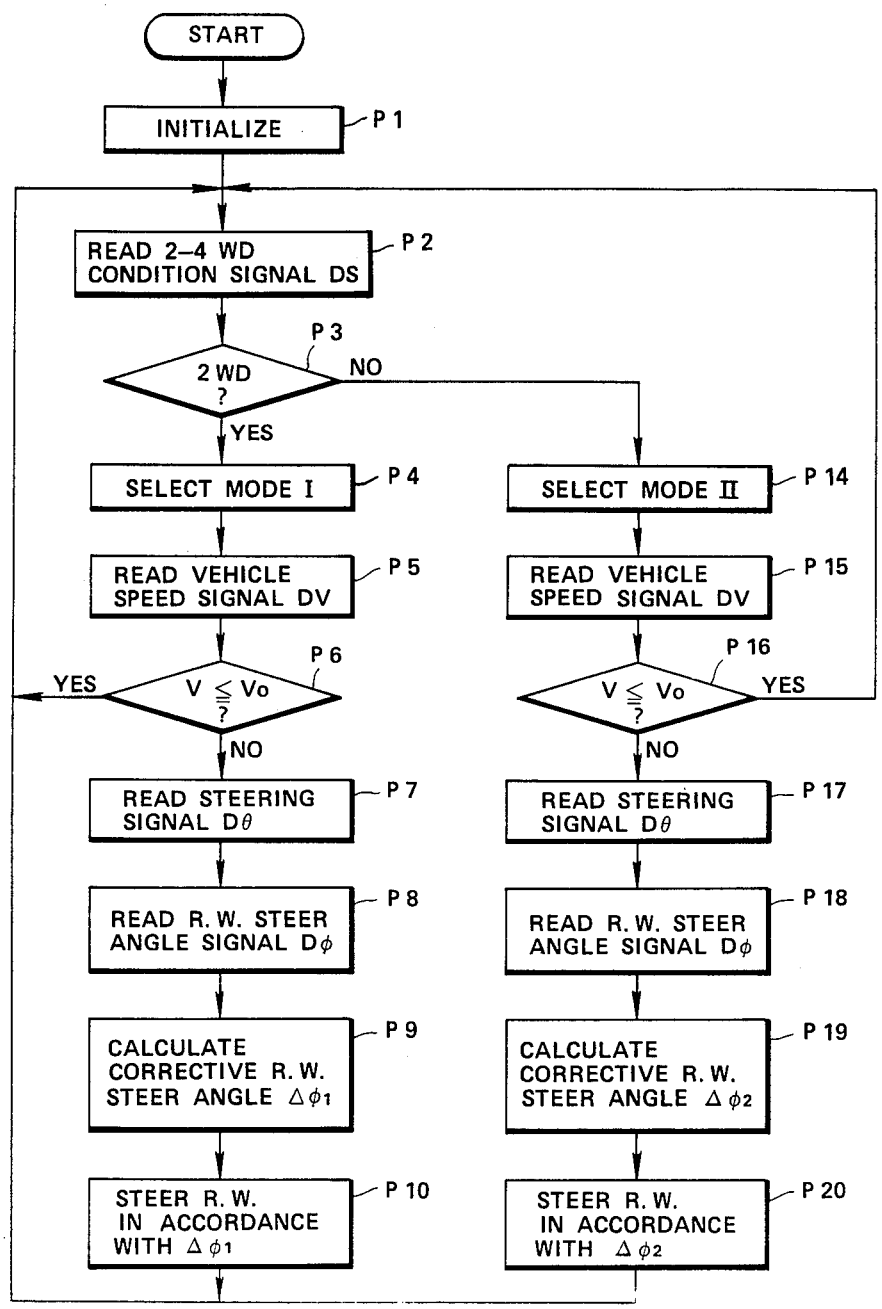
FIG. 3 is a flow chart of a program used in the embodiment of FIG. 2.

One embodiment of the present invention is shown in FIGS. 2–4. FIG. 2 is a schematic view showing a vehicle equipped with a four wheel steer system having a mechanical front wheel steering system and a hydraulic type rear wheel steering system, and a four wheel drive system having a transfer for distributing a driving torque between front and rear wheels.

Right and left front wheels 1R and 1L are rotatably supported, respectively, by right and left knuckle arms 2 which are swingably mounted on a vehicle body. The right and left knuckle arms 2 are connected to right and left ends of a rack rod 4 through right and left tie rods 3, respectively. The rack rod 4 is formed with a rack gear 4a which is engaged with a pinion 6 to form a rack and pinion type steering gear. The pinion 6 is provided at a bottom end of a steering shaft 5, and a steering wheel 7 is provided at a top end of the steering shaft 5.

Right and left rear wheels 8R and 8L are rotatably supported, respectively, by right and left knuckle arms 9 which are swingably mounted on the vehicle body. Both knuckle arms 9 are connected with each other by a rear wheel steering rod 11 through right and left tie rods 10. The steering rod 11 serves as a rod of a hydraulic cylinder actuator 12 of a double acting double ended rod type. The cylinder actuator 12 has right and left power chambers A and B which are separated by a piston 13 integrally mounted on the steering rod 11. The right and left power chambers A and B are connected, respectively, through fluid passages 14R and 14L, to a spring offset type electromagnetic directional control valve 15 having four ports and three positions. A solenoid 15a of the control valve 15 is supplied with an exciting current by a controller 30. The controller 30 can select one of the three positions of the control valve 15 by varying the magnitude of the current supplied to the solenoid 15a.

The control valve 15 is connected with a fluid pressure source 18 through a supply passage 16 and a return passage 17. A reservoir tank 19 is provided at an intermediate point in the return passage 17. The fluid pressure source 18 includes a fluid pump 18a and an electric motor 18b. The motor 18b is driven by a driving current supplied by the controller 30, and drives the pump 18a. A bypass passage 20 extends from the supply passage 16 to the return passage 17, and has an orifice 21 disposed therein.

The right and left front wheels 1R and 1L are connected with right and left front wheels drive shafts 22, respectively, in a swingable manner. The right and left rear wheels 8R and 8L are connected with right and left rear wheel drive shafts 23, respectively, in a swingable manner. The right and left front wheel drive shafts 22 are connected swingably with right and left output shafts 25 which are connected to a transfer 24 through a front wheel final drive unit 26F. The rear wheel drive shafts 23 are connected swingably with a rear wheel output shaft 28 of the transfer 24 through a rear wheel final drive unit 26R and a propeller shaft 27.

The transfer 24 of this embodiment is put into a two wheel drive state or a four wheel drive state selectively by manually operating a 2WD-4WD selector lever (not shown). In the two wheel drive state, the transfer 24 transmits the driving torque only to the front wheels 1R and 1L. In the four wheel drive state, the driving torque is transmitted to all the front and rear wheels 1R, 1L, 8R and 8L. The transfer 24 is united with an engine 40, a clutch 41 and a transmission 42. The transfer 24 distributes the driving force produced by the engine 40 and transmitted to the transfer 24 through the clutch 41 and the transmission 42, between the front wheels and the rear wheels.

A steering angle sensor 29 is provided for sensing an angular displacement of the steering shaft 5. The steering angle sensor 29 senses a steer angle $\theta$ and a steering direction of the front wheels 1R and 1L by sensing the rotational displacement of the steering shaft 5, and delivers a steering angle signal $D\theta$ to the controller 30.

A vehicle speed sensor 31 senses a vehicle speed V, and delivers a vehicle speed signal DV representing the vehicle speed V, to the controller 30. For example, the vehicle speed sensor 31 is arranged to sense a rotational speed of an output shaft of the transmission 42.

A rear wheel steer angle sensor 32 senses a rear wheel steer angle $\phi$ of the rear wheels 8R and 8L, and delivers to the controller 30 a rear wheel steer angle signal $D\phi$ representing the rear wheel steer angle $\phi$ and rear wheel steering direction.

A 2WD-4WD condition sensor 33 determines whether the transfer 24 is in the two wheel drive state or in the four wheel drive state, by sensing a position of the 2WD-4WD selector lever, and delivers to the controller 30 a 2WD-4WD condition signal DS.

The controller 30 is connected with a power supply 38 such as a battery. The controller 30 has a microcomputer which includes an interface circuit 30a, a central processing unit (CPU) 30b and a memory section 30c having storage devices such as RAM and ROM. The controller 30 further has one or more A/D converters and an output circuit (not shown). The steering angle signal $D\theta$ of the steering angle sensor 29, the vehicle speed signal DV of the vehicle speed sensor 31, the rear wheel steer angle signal $D\phi$ of the rear wheel steer angle sensor 32 and the condition signal DS of the 2WD-4WD condition sensor 33 are inputted to the CPU 30b through the A/D converter and the interface circuit 30a. The CPU 30b processes the input signals according to one or more programs stored in the memory section 30c, and delivers output signals through the interface circuit 30a and the output circuit. The output signals produced by the controller 30 are a control signal CM sent to the motor 18b of the pressure source 18 for supplying the driving current, and a control signal CS sent to the solenoid 15a of the control valve 15 for supplying the exciting current.

A graph of FIG. 4 is stored in predetermined memory locations of the memory section 30c in the form of a table 30d. From the table 30d corresponding to the graph of FIG. 4, the CPU 30b can obtain a value $\phi_1$ or $\phi_2$ of the rear wheel steer angle corresponding to a value of the front wheel steer angle $\theta$ (which corresponds to the angular displacement of the steering wheel 7). The table 30d includes two control modes I and II as shown in FIG. 4. The ratio of the rear wheel steer angle to the steering wheel angle of the control mode I is not equal to that of the control mode II. Each of the control modes I and II varies continuously with change in the vehicle speed V. In each of the control modes I and II, the ratio of the rear wheel steer angle $\phi$ to the front wheel steer angle $\theta$ is increased as the vehicle speed increases.

FIG. 3 shows, as an example, a program which is stored in the ROM of the memory section 30c and performed by the CPU 30b.

A step P1 of FIG. 3 is a step for initialization. At a step P2, the CPU 30b reads the 2WD-4WD condition signal DS sent from the condition sensor 33, and temporarily stores a value representing the drive state of the vehicle in a predetermined memory location of the memory section 30c. At a step P6, the CPU 30b reads out the value stored at the step P2, and determines whether the vehicle is in the two wheel drive state or the four wheel drive state.

If the vehicle is in the two wheel drive state, the CPU 30b proceeds to a step P4, and selects the control mode I from the table 30d stored in the memory section 30c. Then, at a step P5, the CPU 30b reads the vehicle speed signal DV of the vehicle speed sensor 31, calculate the vehicle speed V from the vehicle speed signal DV, and temporarily stores the thus-determined vehicle speed V in a predetermined memory location of the memory section 30c. At a next step P6, the CPU 30b determines whether the vehicle speed V determined at the step P5 whether the vehicle speed V determined at the step P5 is greater than a predetermined reference value $V_0$ which is stored preliminarily in a predetermined memory location of the memory section 30c. The answer of the decision step P6 is used for determining whether to forbid the control for steering the rear wheels 8R and 8L in the same direction as the steering direction of the front wheels 1R and 1L. If the vehicle speed V is equal to or smaller than the reference value $V_0$ ($V \leq V_0$), then the CPU 30b returns to the step P2. If the vehicle speed V is greater than $V_0$, the CPU 30b proceeds to a next step P7.

At the step P7, the CPU 30b reads the steering angle signal $D\theta$ of the steering angle sensor 29, calculates the front wheel steer angle $\theta$ from the steering angle signal $D\theta$, and temporarily stores the thus-determined front wheel steer angle $\theta$ in a predetermined memory location of the memory section 30c.

At a step P8, the CPU 30b reads the rear wheel steer angle signal $D\phi$ of the sensor 32, calculates the current rear wheel steer angle $\phi$ from the signal $D\phi$, and stores temporarily the thus-determined rear wheel steer angle $\phi$ in a predetermined memory location of the memory section 30c.

At a step P9, the CPU 30b determines a desired rear wheel steer angle $\phi_1$ corresponding to the vehicle speed V determined at the step P5, and the front wheel steer angle $\theta$ determined at the step P7 by using the control mode I selected at the step P4, and then determines a corrective rear wheel steer angle $\Delta\phi_1$ by subtracting the current rear wheel steer angle $\phi$ determined at the step P8 from the desired rear wheel steer angle $\phi_1$.

At a step P10, the CPU 30b outputs the control signal CS to the solenoid 15a and the control signal CM to the motor 18b to operate the hydraulic cylinder 12 in accordance with the corrective rear wheel steer angle $\Delta\phi_1$. Then, the CPU 30b returns from the step P10 to the step P2.

If it is decided at the step P3 that the vehicle is in the four wheel drive state, the CPU 30b proceeds from the step P3 to a step P14, at which the CPU 30b selects the control mode II from the table 30d. Then, the CPU 30b performs steps P15-P20 which are similar to the steps P5-P10, respectively. At the step P19, the CPU 30b determines a desired rear wheel steer angle $\phi_2$ corresponding to the vehicle speed V determined at the step P15 and the front wheel steer angle $\theta$ determined at the step P17 by using the control mode II selected at the step P14, and then determines a corrective rear wheel steer angle $\Delta\phi_2$ by subtracting the current rear wheel steer angle $\phi$ determined at the step P18 from the desired rear wheel steer angle $\phi_2$.

The control system of this embodiment is operated as follows:

(1) When the vehicle speed V is equal to or smaller than the predetermined value $V_0$:

In this case, the control for steering the rear wheels 8R and 8L in the same direction as the steering direction of the front wheels 1R and 1L is forbidden irrespective of whether the vehicle is in the two wheel drive state or in the four wheel drive state. In this way, the control system ensures the desired cornering characteristic at low vehicle speeds by preventing an excessive increase of the understeer tendency, so that parking and slow speed maneuvering can be made easier.

(2) When the vehicle speed V is greater than the predetermined value $V_0$, and the vehicle is in the two wheel drive state:

In this case, the control system selects the control mode I in compliance with the result of the decision step P3, and steers the rear wheels in accordance with the control mode I. As shown in FIG. 4, the ratio of the rear wheel steer angle $\phi$ to the front wheel steer angle $\theta$ is small in the control mode I as compared with the control mode II. In general, the understeer tendency is increased when the driving torque of the engine is transmitted only to the front wheel pair. Accordingly, the control system prevents an excessive increase of the understeer tendency by selecting the control mode I in which the ratio of the rear wheel steer angle to the front wheel steer angle is relatively small. At the step P9, the CPU 30b retrieves a value of the desired rear wheel steer angle $\phi_1$ corresponding to the vehicle speed V and the front wheel steer angle $\theta$ in accordance with the control mode I, and calculates the required corrective angular dislacement $\Delta\phi_1$ of the rear wheels which is equal to the difference obtained by subtracting the current rear wheel steer angle $\phi$ from the desired rear wheel steer angle $\phi_1$. The hydraulic cylinder actuator 12 is operated so as to weaken the understeer tendency, in accordance with the corrective angular displacement $\Delta\phi_1$. In this way, the desired weak understeer tendency is ensured.

(3) When the vehicle speed is greater than the predetermined value $V_0$, and the vehicle is in the four wheel drive state:

In this case, the control system selects the control mode II in compliance with the result of the decision step P3. The ratio of the rear wheel steer angle $\phi$ to the front wheel steer angle $\theta$ is great in the control mode II as compared with the control mode I, as shown in FIG. 4. In general, the steer characteristic of the vehicle driven in the four wheel drive state approaches neutral steer. Accordingly, the control system of this embodiment increases the understeer by selecting the control mode II so as to maintain the steer characteristic unchanged even when the drive system is changed from the front two wheel drive state to the four wheel drive state. At the step P19, the CPU 30b retrieves a value of the desired rear wheel steer angle $\phi_2$ according to the control mode II by using the vehicle speed V and the front wheel steer angle $\theta$ and calculates the required corrective rear wheel angular displacement $\Delta\phi_2$ according to the control mode II which is equal to the difference obtained by subtracting the current rear wheel steer angle $\phi$ from the desired rear wheel steer angle $\phi_2$ according to the control mode II. Then, the control system operates the hydraulic cylinder actuator 12 in accordance with the corrective rear wheel angular displacement $\Delta\phi_2$ so as to increase the understeer tendency.

In this way, the control system maintains the desired weak understeer characteristic by counteracting the neutral steer tendency due to the four wheel drive. The steer characteristic of the vehicle does not change irrespective of the selection between the front two wheel drive mode and the four wheel drive mode. Therefore, the vehicle is made safer and easier to handle for average drivers.

When the four wheel drive system is arranged so that the engine power is transmitted only to the rear wheels in the two wheel drive mode, a desired rear wheel steer angle $\phi_3$ for the rear two wheel drive should be made greater than the desired rear wheel steer angle $\phi_2$ for the four wheel drive. In general, the oversteer tendency is increased when only the rear two wheels are driven by the engine power. Therefore, the control system should be arranged to select a third control mode III whose ratio of the rear wheel steer angle to the front wheel steer angle is greater than that of the control mode II. The control mode III varies continuously with change in the vehicle speed in the same manner as the control modes I and II. The control system selects the third control mode III in the rear two wheel drive state, and determines the corrective rear wheel steer angle in the same manner as in the front two wheel drive state. In this case, the control system can maintain the desired weak understeer characteristics by counteracting the oversteer tendency due to the rear two wheel drive.

It is optional to further provide a selector switch for obtaining a stronger understeer characteristic, a stronger oversteer characteristic and/or a stronger neutral steer characteristic. In this case, the slopes of the control modes I and II shown in FIG. 4 are changed in accordance with the position of the selector switch. It is possible to maintain the steer characteristic selected by the selector switch unchanged irrespective of shift from the two wheel drive to the four wheel drive and vice versa.

In the above-mentioned embodiment, the rear wheel steering control is forbidden in the vehicle speed range below $V_o$ in order to improve the steering response of the vehicle and the durability of various actuators (such as the hydraulic cylinder actuator and the control valve). However, it is optional to omit the control for forbidding rear wheel steering control in the vehicle speed range below $V_0$. Furthermore, it is possible to employ such a control as to steer the rear wheels in the direction opposite to the steering direction of the front wheels at low vehicle speeds, and to steer the rear wheels in the same direction as the front wheels at medium and high vehicle speeds.

Figure 5:
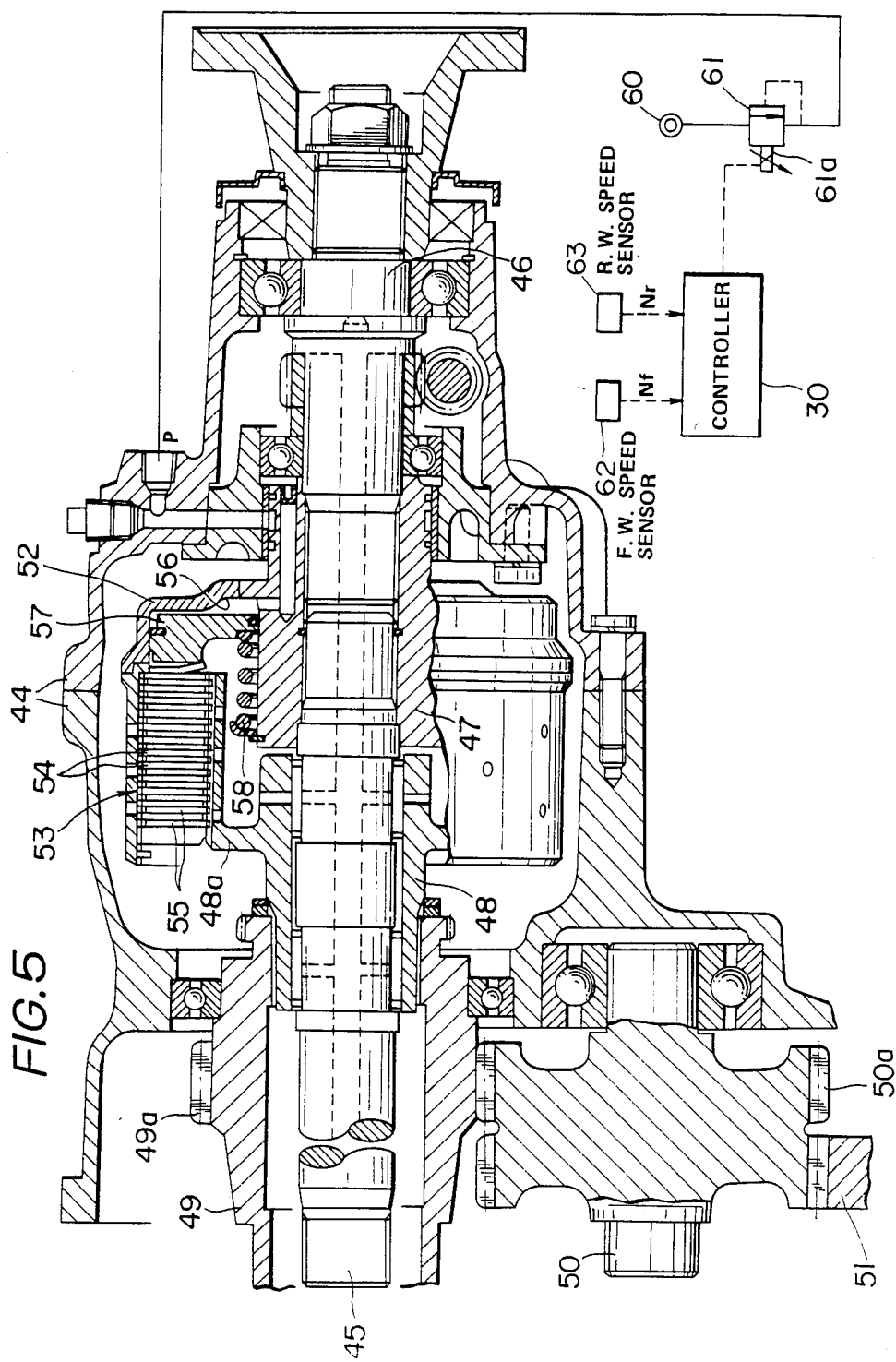
FIG. 5 is a sectional view of a transfer which can be used in the present invention in lieu of the transfer of FIG. 2.

It is optional to employ a transfer which can continuously vary the driving torque distribution ratio between the front and rear wheels. FIG. 5 shows one example of such a transfer.

The transfer shown in FIG. 5 is of the same type as disclosed in the following applications. (i) U.S. patent application Ser. No. 830,015, filed on Feb. 18, 1986, (ii) U.S. patent application Ser. No. 820,055, filed on Jan. 21, 1986, (iii) U.S. patent application, Ser. No.=906,309 filed Sept. 12, 1986 Inventors=Genpei Natio et al., Corresponding foreign application=Japanese patent application Nos. 60-202896 and 60-208477, (iv) U.S. patent application, Ser. No. 893,245 filed Aug. 5, 1986 Naito, Corresponding foreign application=Japanese application No. 60-172934, and (v) Japanese patent application No. 60-147318.

In a case 44 of the transfer of FIG. 5, an input shaft 45 connected with the output shaft of the transmission 42 of FIG. 2, and a rear wheel side output shaft 46 connected with the propeller shaft 27 of FIG. 2 are coaxially splined to a coupling member 47 of a hollow cylindrical shape, so that the input shaft 45 and the rear wheel side output shaft 46 rotate together. The input shaft 45 is enclosed coaxially in first and second hollow shafts 48 and 49. The second hollow shaft 48 is rotatably mounted on the input shaft 45. The first hollow shaft 49 is splined to the second hollow shaft 48 so that both shafts rotate together. A drive gear 49a is integrally formed on the outer circumference of the first hollow shaft 49. The drive gear 49a is in mesh with a counter gear 50a which is integrally formed in a counter shaft 50, and which is in mesh with a driven gear 52 formed in a front wheel side output shaft.

A hub 48a is integrally formed on the outer circumference of the second hollow shaft 48, and a drum 52 is integrally formed on the outer circumference of the coupling member 47. A hydraulic type multiple disc friction clutch (transfer clutch or inter-axle clutch) 53 is formed between the hub 48a and the drum 52. The clutch 53 has an alternating series of drive plates 54 splined to the drum 52 and driven plates 55 splined to the hub 48a. The clutch 53 further has a piston 57 which forms a fluid pressure chamber 56 between the piston 57 and the drum 52, and produces a frictional force between the drive and driven plates 54 and 55 by the action of the fluid pressure introduced into the pressure chamber 56. The clutch 53 further has a return spring 58 for urging the piston in the direction to remove the frictional force between the drive and driven plates.

A fluid pressure source 60 for producing a high fluid pressure is connected with the pressure chamber 56 of the clutch 53 through an electromagnetic valve 61. The controller 30 of this example can control the fluid pressure in the pressure chamber 56 by controlling a control signal supplied to a solenoid 61a of the valve 61. The controller 30 of FIG. 5 is connected with a front wheel speed sensor 62 for sensing a rotational speed of the front wheel side output shaft, and a rear wheel speed sensor 63 for sensing a rotational speed of the rear wheel side output shaft 46.

In the example of FIG. 5, the driving torque distribution between the front wheel pair and rear wheel pair is sensed by sensing the rotational speed of the front wheel output shaft and the rotational speed of the rear wheel output shaft 46, and the controller 30 varies the ratio of the rear wheel steer angle to the steering wheel angle in accordance with the thus-sensed driving torque distribution.

The controller 30 may be composed of electronic circuits such as comparing circuits and logic circuits, instead of a microcomputer.

What is claimed is:
1. A vehicle comprising:
   a four wheel drive system having a transfer for distributing a driving torque between a front wheel pair and a rear wheel pair, said transfer having means for varying a driving torque distribution between said front and rear wheel pairs,
   a four wheel steer system for steering both of said front and rear wheel pairs, said four wheel steer system having means for steering said rear wheel pair in response to a control signal,
   means for sensing said driving torque distribution, and
   controlling means for varying a rear wheel steering ratio of a rear wheel steer angle to a steering wheel angle in accordance with said driving torque distribution sensed by said driving torque distribution sensing means in such a manner as to maintain a steer characteristic of said vehicle substantially unchanged irrespective of change in said driving torque distribution, by manipulating said control signal.
2. A vehicle according to claim 1 wherein said sensing means includes means for delivering a condition signal representing said torque distribution to said controlling means and said controlling means includes means for decreasing said rear wheel steering ratio when a share of said driving torque distributed to said rear wheel pair is decreased and increasing said rear wheel steering ratio when a share of said driving torque distributed to said front wheel pair is decreased.

3. A vehicle according to claim 2 wherein said vehicle further comprises means for sensing a vehicle speed of said vehicle, and said controlling means steers said rear wheel pair in the same direction as a steer direction of said front wheel pair when said vehicle speed sensed by said vehicle speed sensing means is higher than a predetermined vehicle speed value, and controls said rear wheel steering ratio in accordance with said driving torque distribution only when said vehicle speed is higher than said predetermined vehicle speed value.

4. A vehicle according to claim 3 wherein said controlling means includes means for increasing said rear wheel steering ratio as said vehicle speed increases, and means for decreasing said rear wheel steering ratio as said vehicle speed decreases.

5. A vehicle according to claim 4 wherein said controlling means includes means for constraining the rear wheel steering ratio to be substantially constant independent of said steering wheel angle when said driving torque distribution and said vehicle speed are fixed.

6. A vehicle according to claim 5 wherein said four wheel steer system comprises a front wheel steering gear mechanism for steering said front wheel pair in accordance with said steering wheel angle, and a rear wheel steering hydraulic actuator for steering said rear wheel pair in response to said control signal.

7. A vehicle according to claim 3 wherein said four wheel drive system includes torque distribution varying means with two states, a first state in which said driving torque is distributed to both of said front and rear wheel pairs, and a second state in which said driving torque is transmitted only to said front wheel pair, and said controlling means includes means for causing said rear wheel steering ratio in said four wheel drive state to be greater than said rear wheel steering ratio in said front wheel drive state when the value of said vehicle speed is above said predetermined vehicle speed value.

8. A vehicle according to claim 7 wherein said four wheel drive system comprises a manual selector lever for selecting one of said four wheel drive state and said front wheel drive state alternatively, and said driving torque distribution sensing means senses a position of said selector lever.

9. A vehicle according to claim 3 wherein said four wheel drive system includes torque distribution varying means with a first and second state, a four wheel drive state in which said driving torque is transmitted to both of said front and rear wheel pairs, and a rear wheel drive state in which said driving torque is transmitted only to said rear wheel pair, respectively, and said controlling means includes means for varying said rear wheel steering ratio so that, for any given value of said vehicle speed above said predetermined speed value, said rear wheel steering ratio in said four wheel drive state is smaller than said rear wheel steering ratio in said rear wheel drive state.

10. A vehicle according to claim 3 wherein said transfer of said four wheel drive system comprises a transfer clutch for varying a driving torque transmitted to one of said front and rear wheel pairs in accordance with a clutch engagement force.

11. A vehicle according to claim 10 wherein said transfer has an input member for receiving an input torque, a first output member connected with said rear wheel pair, and a second output member connected with said front wheel pair, and said transfer clutch is disposed between said input member and said second output member for varying said driving torque transmitted to said front wheel pair, said controlling means decreasing said rear wheel steering ratio as said clutch engagement force of said transfer clutch is increased.

12. A vehicle according to claim 3 wherein said four wheel steer system includes a means for said rear wheel pair in a straight ahead position when said fixing vehicle speed is equal to or lower than said predetermined speed value.

13. A vehicle according to claim 3 wherein said four wheel steer system includes means for said rear wheel pair in a direction opposite to said steering direction of said front wheel pair when said vehicle speed is equal to or lower than said predetermined speed value.

14. A vehicle according to claim 3 wherein said four wheel steer system further comprises a manual selector switch and a means for varying said rear wheel steering ratio in accordance with a position of said selector switch.

* * * * *